J. B. GROH.
ROTARY ENGINE.
APPLICATION FILED MAY 28, 1910.

1,006,546.

Patented Oct. 24, 1911.
7 SHEETS—SHEET 2.

WITNESSES.
Robt. E. Young

INVENTOR.
Jacob B. Groh.
By Henry L. Reynolds,
attorney.

J. B. GROH.
ROTARY ENGINE.
APPLICATION FILED MAY 28, 1910.
1,006,546.
Patented Oct. 24, 1911.
7 SHEETS—SHEET 3.
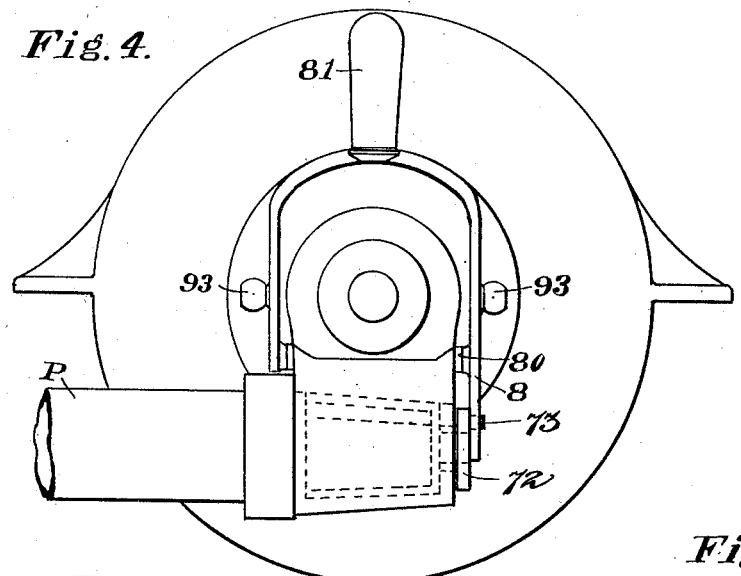
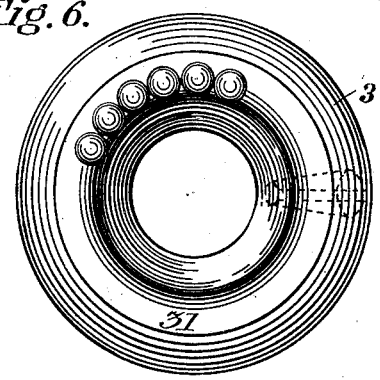
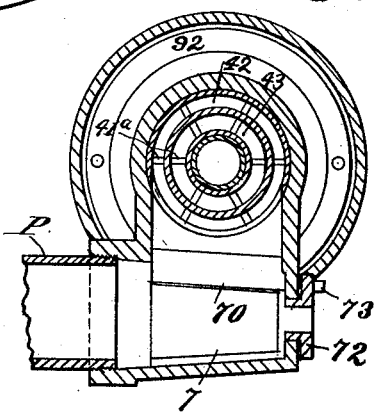
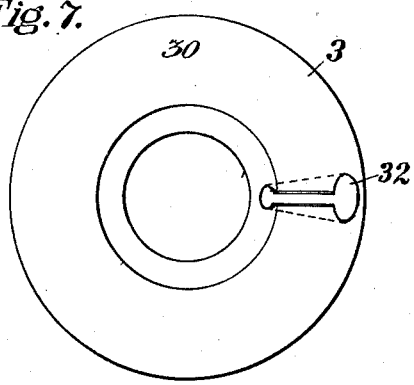
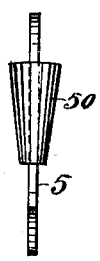
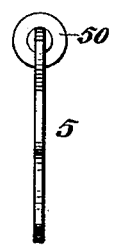
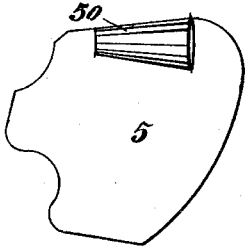
WITNESSES.
Robt. S. Young
Jno. W. Dorer
INVENTOR.
JACOB B. GROH.
BY Henry L. Reynolds
HIS ATTORNEY.

J. B. GROH.
ROTARY ENGINE.
APPLICATION FILED MAY 28, 1910.

1,006,546.

Patented Oct. 24, 1911.
7 SHEETS—SHEET 4.

WITNESSES.
Robt. S. Young
Jno. W. Dover.

INVENTOR.
Jacob B. Groh.
By Henry L. Reynolds,
attorney.

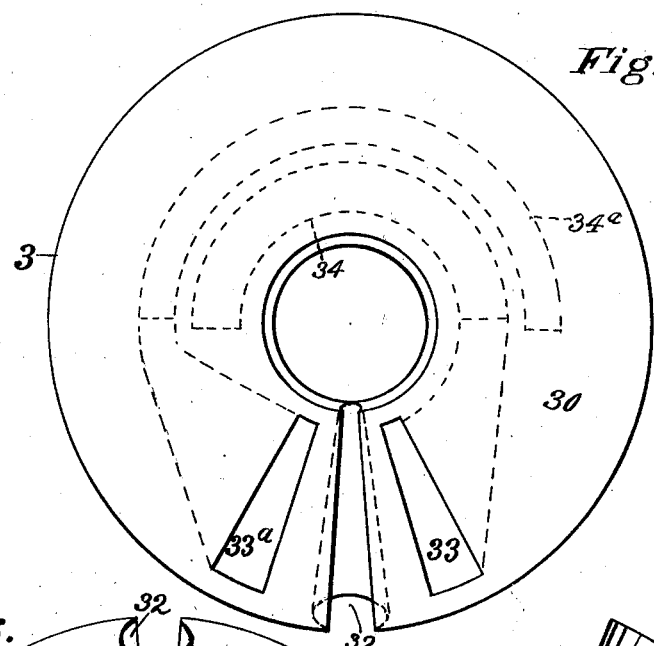
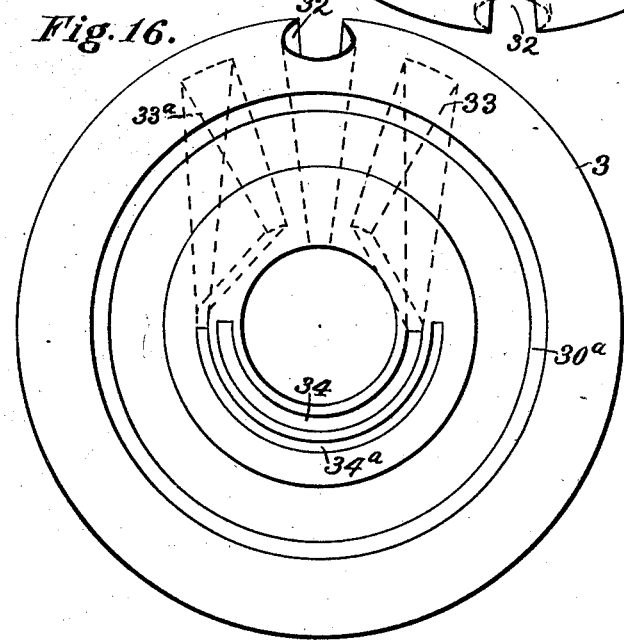
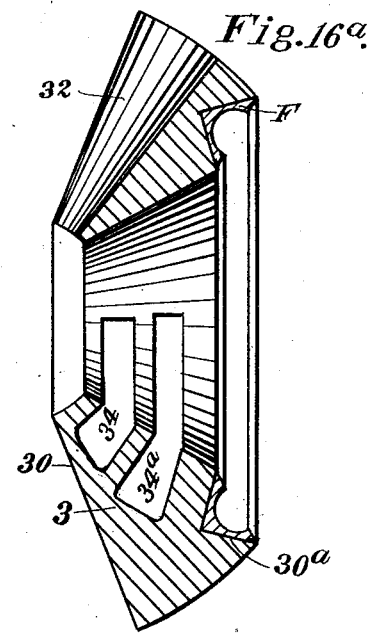

J. B. GROH.
ROTARY ENGINE.
APPLICATION FILED MAY 28, 1910.

1,006,546.

Patented Oct. 24, 1911.

7 SHEETS—SHEET 6.

WITNESSES.

INVENTOR.
Jacob B. Groh.
By Henry L. Reynolds,
attorney.

J. B. GROH.
ROTARY ENGINE.
APPLICATION FILED MAY 28, 1910.
1,006,546.
Patented Oct. 24, 1911.
7 SHEETS—SHEET 7.
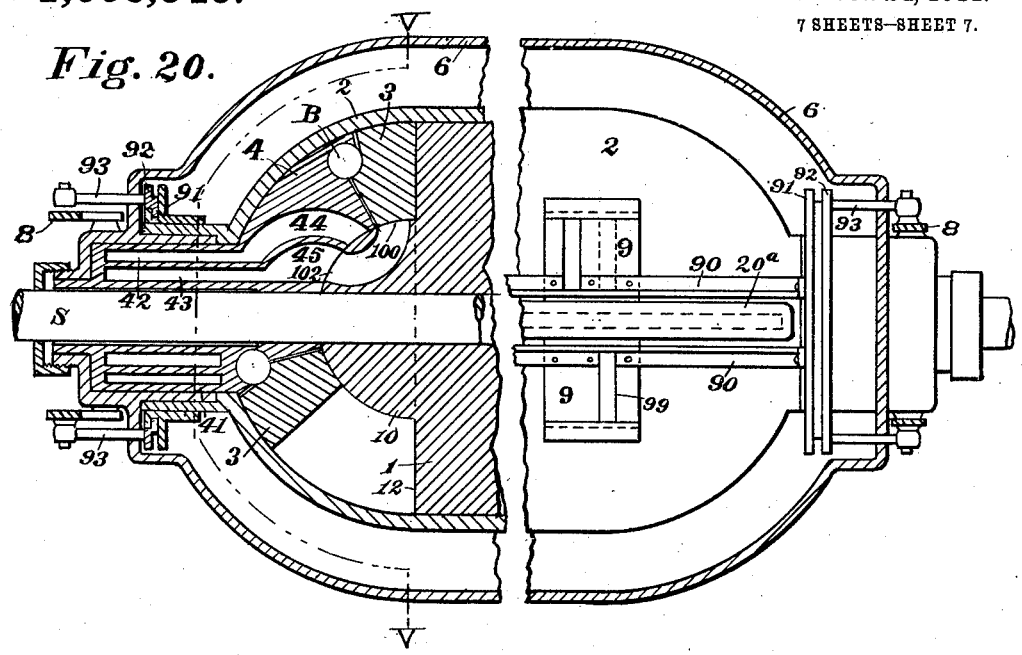
Fig. 20.
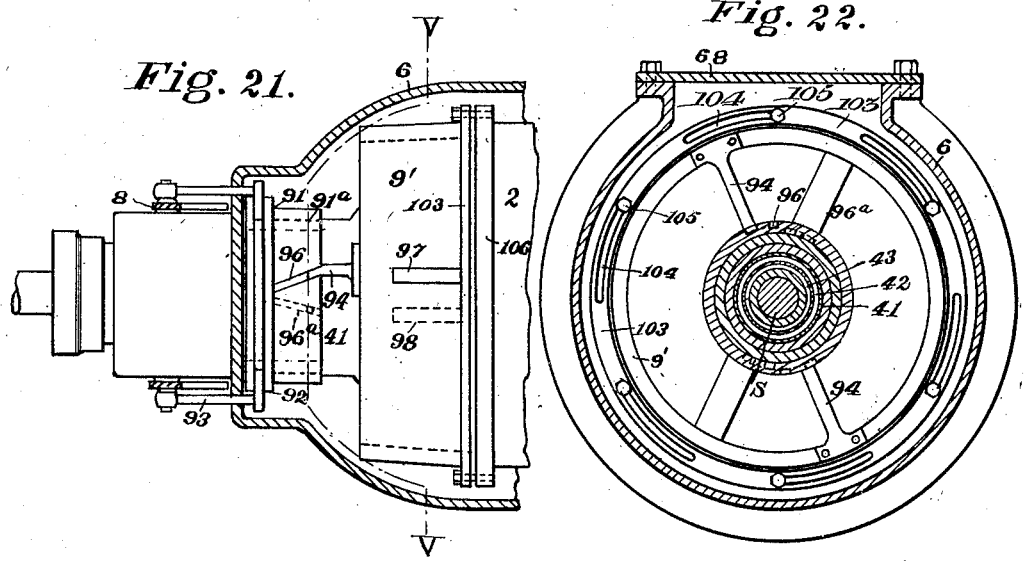
Fig. 21.
Fig. 22.
WITNESSES.
INVENTOR.
Jacob B. Groh.
By Henry L. Reynolds,
Attorney.

UNITED STATES PATENT OFFICE.

JACOB B. GROH, OF SEATTLE, WASHINGTON, ASSIGNOR OF ONE-HALF TO JOSEPH M. HAWTHORNE, OF SEATTLE, WASHINGTON.

ROTARY ENGINE.

1,006,546.  Specification of Letters Patent.  Patented Oct. 24, 1911.

Application filed May 28, 1910. Serial No. 563,944.

*To all whom it may concern:*

Be it known that I, JACOB B. GROH, a citizen of the United States, residing at Seattle, in the county of King and State of Washington, have invented certain new and useful Improvements in Rotary Engines, of which the following is a specification.

My invention relates to rotary engines, or engines of that type in which the power generating members rotate, instead of reciprocating, and comprises the novel parts and combinations of parts which will be hereinafter described and particularly pointed out in the claims.

The object of my invention is to produce an engine in which the reciprocating feature of the ordinary engines is eliminated to the greatest possible degree, and to have all the moving parts rotative in truly circular orbits, whereby the speed of its operation is not interfered with or limited by the inertia strains caused by starting and stopping heavy masses at each revolution.

In the accompanying drawings I have shown my invention in the form which is now preferred by me.

Figure 1:
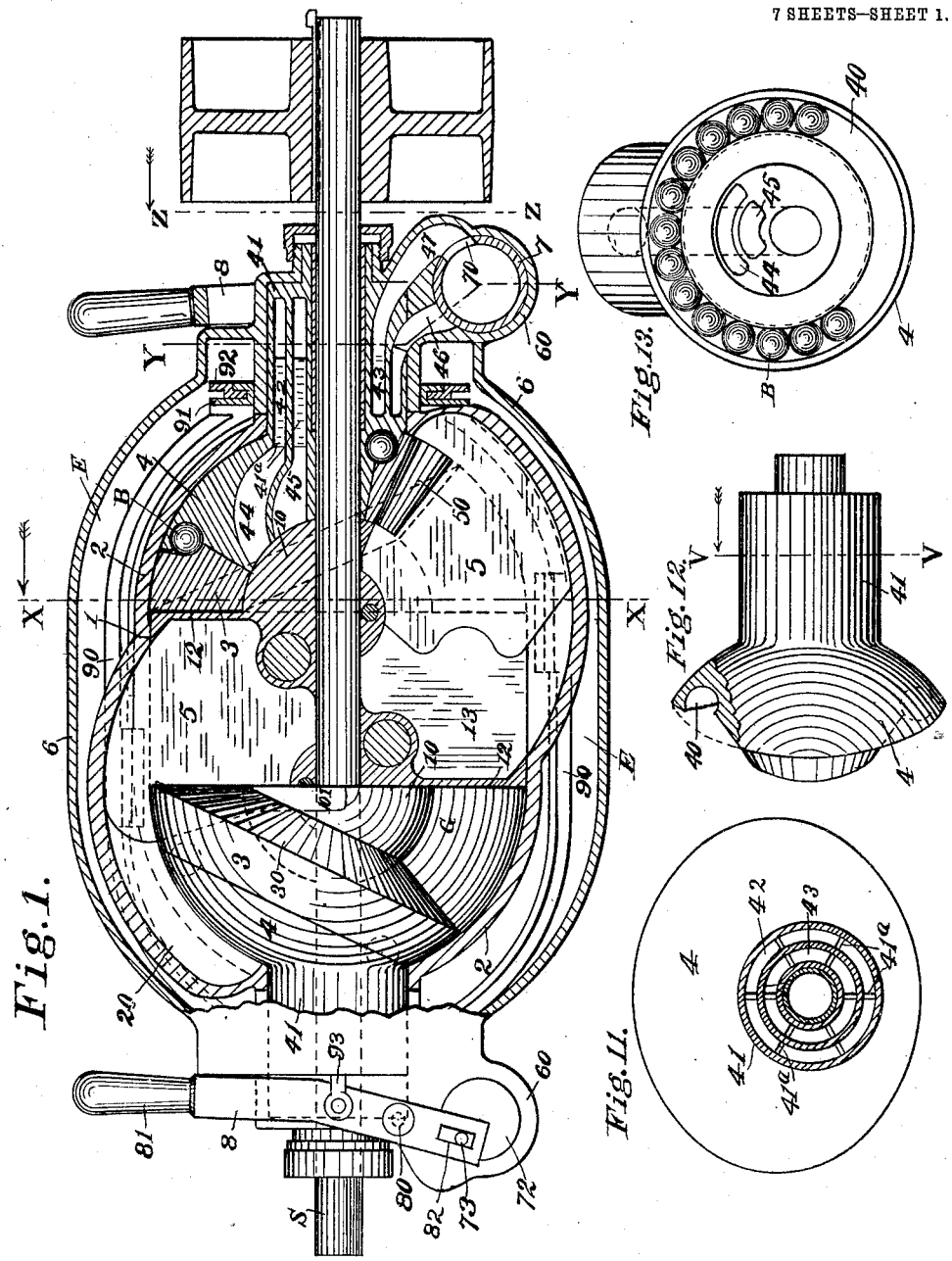
Figure 2:
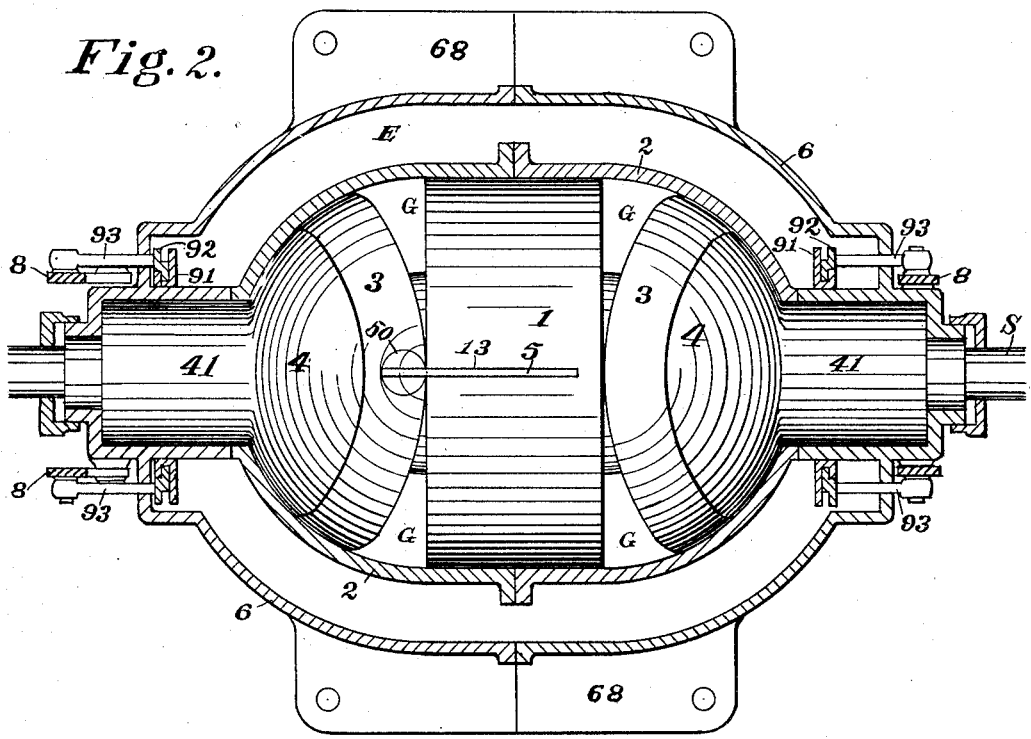
Figure 3:
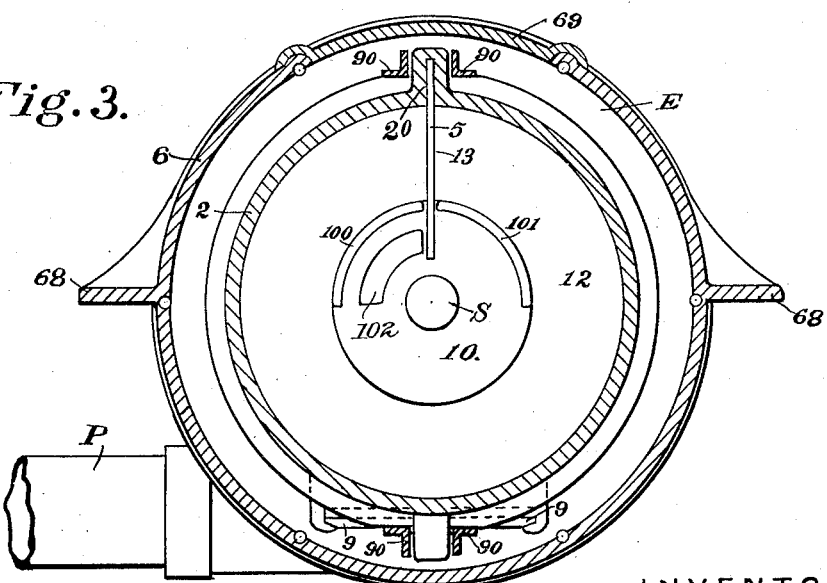
Figure 14:
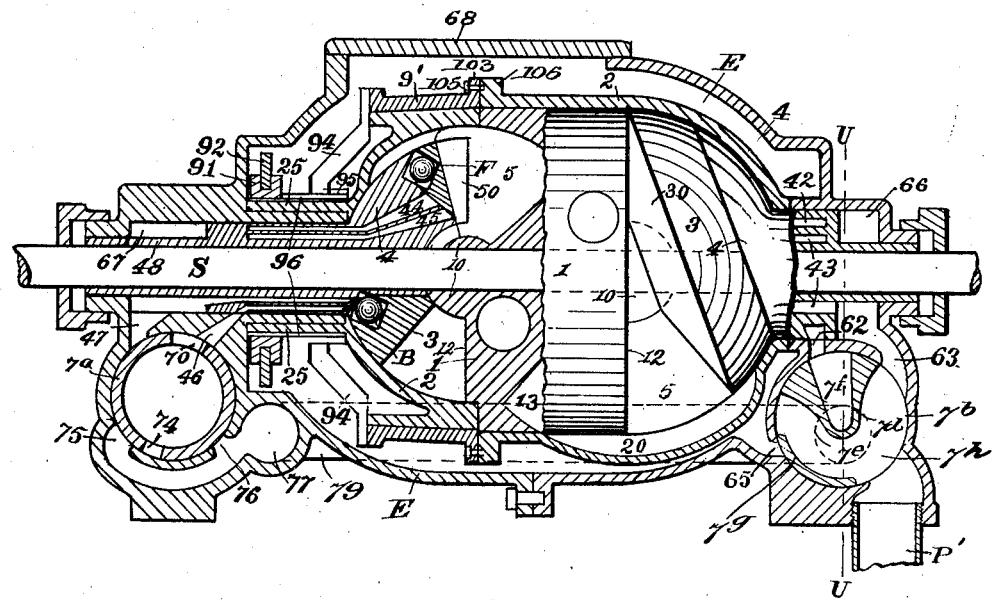
Figure 15:
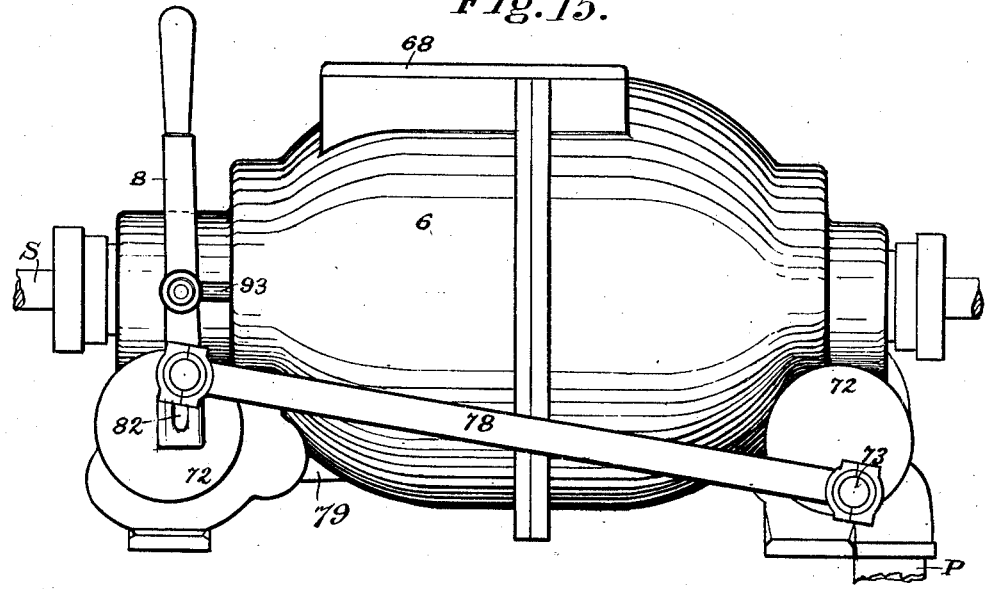
Figure 18:
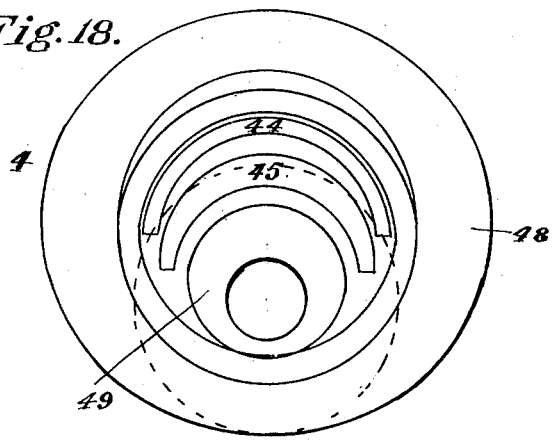
Figure 19:
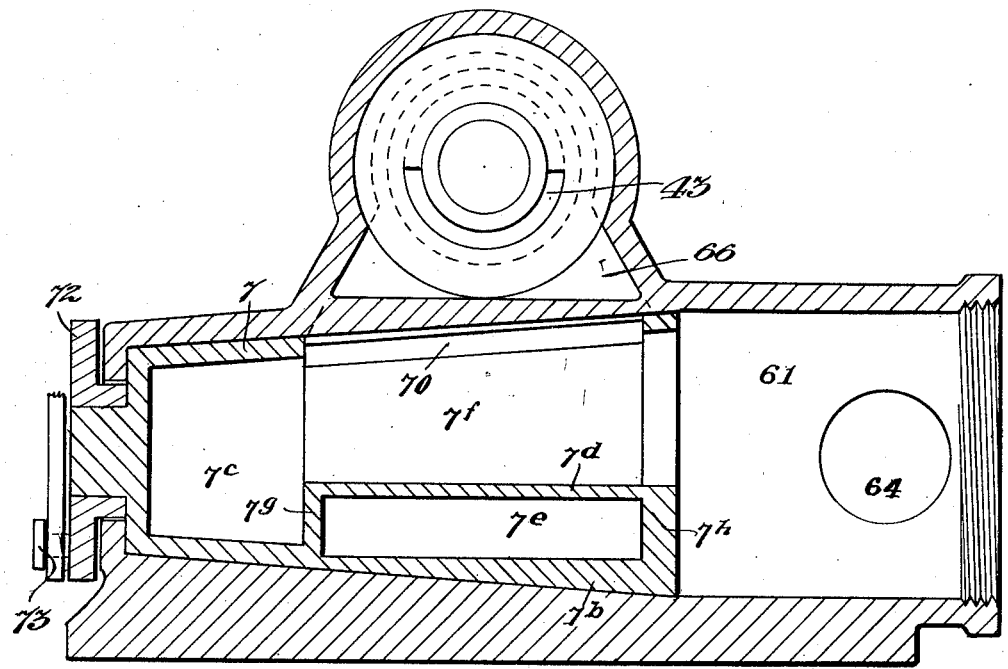

Figure 1 is a side elevation of my invention mainly in section. Fig. 2 is a plan view showing the casings in section and other parts in plan. Fig. 3 is an end elevation showing the casings in section upon the lines X, X, of Fig. 1. Fig. 4 is an end elevation. Fig. 5, is a section taken upon the line, Y, Y, of Fig. 1. Figs. 6 and 7 are, respectively, obverse and reverse views of one of the rotative rings. Figs. 8, 9 and 10, are views from different positions of one of the partition or piston plates. Figs. 11, 12 and 13, are views from different positions of one of the fixed bearing members, Fig. 11 showing the stem portion thereof in section upon the line V, V, of Fig. 12. Fig. 14, is an elevation, with parts in section, showing a compound type of motor. Fig. 15, is a side elevation of the compound type. Figs. 16 and 17 are obverse and reverse views of a rotative ring as used in the low pressure end of the compound type, and 16ᵃ a section of the said ring. Fig. 18, is an inner end or face view of the fixed bearing member used in the low pressure end of the compound type. Fig. 19, is a section of the valve for the low pressure end, taken upon the line U, U, of Fig. 14. Fig. 20, is a plan view of the simple type of engine shown in Figs. 1 and 2, one end being in section upon the center line, and the other showing only the outer stationary casing in section. Fig. 21, is a plan view, the outer casing in section, showing the mechanism for operating the ring valve 9' upon the type of engine shown in Figs. 1 and 2. Fig. 22, is a section upon the line V, V of Figs. 20 and 21.

The following is a description of my invention and its principle of construction and operation as illustrated in the accompanying drawings. This, and the illustration thereof herein given, is not to be understood as exhaustive of the various forms in which my invention may be constructed, but only as an exposition of a preferred form and concrete embodiment thereof.

The scope of my invention is to be determined by reference to the terms of the claims.

My engine is constructed about a central revolving shaft S, which shaft carries what I call a "rotor," the same, as herein shown, having a central body, in the form of a disk or cylinder, secured to turn therewith and having surfaces of rotation of a general radial character, although this shape is more a matter of convenience and preference in design than an essential in principle. This central body of the rotor should have sufficient dimensions axially, or in the direction of the length of the shaft S, to contain within its body the pockets or chambers 13 for the reception of the partition or piston plates 5, which plates have an apparent or relative reciprocation lengthwise the shaft. It should also have surfaces of revolution 12, adapted each to constitute one wall of a steam chamber. The chief function of the rotor is to accommodate the axial movements of the plates 5 and to form a wall of the steam chamber.

I have shown my engine with a steam chamber and its related parts at each side of the central rotor. It will be noted that these parts upon one side of the rotor are mere duplications of those on the other side and that either set might be omitted without affecting the operation of the other set.

In conjunction with each of the radial surfaces 12 upon the rotor, I employ a member rotative upon an axis which lies at an angle with the axis of the shaft, said axis preferably intersecting the shaft at a point which constitutes the center of rotation of the surface 12 of the rotor. The co-acting surfaces 12 of the rotor and 30 of its co-acting, rotative member, are surfaces of rotation about a common center, one or both being, however, of conical character, so that, while lying in contact along a radial line, they are divergent elsewhere, thereby forming a steam chamber, in conjunction with inner and outer inclosing surfaces.

The member 3 which co-acts with the rotor to form the steam chamber, is in the form of a ring, (see Figs. 6, 7, 16, 16ª and 17), which surrounds the shaft S. Its inner and outer surfaces are sections of the surfaces of spheres, wherefore I have called these, spherical annular rings, or spherical annuli, as they extend through only a small part of a polar circle, by which I mean a great circle which passes through the pole, or the axis about which it turns. One of these rings is shown in obverse and reverse in Figs. 6 and 7. These rings and the rotor have a universal pivot bearing at their centers, whereby they may rotate freely in contact, although turning about different axes. This bearing consists of a half sphere or ball upon one and a like spherical cavity or recess upon the other. Theoretically, these may be interchangeably applied to either member, but practically, I prefer that the ball 10, be upon the central rotor 1, and the ring 3 be provided with the complemental socket or cavity which receives this ball. Upon this ball-and-socket joint, the ring and rotor freely turn upon diverging axes.

That part of the surface of the ball 10 which is not covered by the ring constitutes the inner surface of the steam chamber.

Surrounding cylinder 1, which cylinder constitutes the chief member of the rotor, and extending axially in each direction therefrom, is a casing 2, which, at its ends, is concaved, so as to form a hemispherical chamber at each end of the cylinder 1. That is, the inner surface of these end portions of the casing are surfaces of spheres, having their centers at the centers of intersection of the axes of the rings and of the rotor. In the form of my invention herein shown and described, this casing is made to turn with the cylinder 1, the two being, in effect, one piece, so far as consideration of their action is concerned. For convenience of construction and for other practical reasons, it is desirable and necessary that they be made in various parts and joined together to form an integral whole. The casing might, from one view point, be considered a part of the rotor, as it is secured to and rotates with it.

The shaft S, turns in bearings formed within two fixed bearing members, or cones, which are so constructed as to perform several functions. These members are shown separate from the other parts in Figs. 11, 12, and 13. Each of these members has a cylindrical shank 41, and a head 4, which has an outer conical surface having its axis at an angle with the axis of the shaft but intersecting the same, and having the base of the cone shaped to coincide with the curvature of the spherical inner surface of the ends of the casing 2, with which it makes contact. Through a central or axial hole in the shank 41 of this fixed bearing member, passes and turns the shaft S, the bearing members 41 thus constituting the journal bearings for the shaft S. The shank 41 is supported and held in any suitable manner from or within a stationary frame member. I have herein shown it as secured within a suitable cylindrical recess in the frame casing 6. The cylindrical outer shape of the shank 41 is not essential in the simple form of engine shown in Figs. 1 and 2. The inner ends of these fixed members or cones are spherically concaved to fit the outer surface of the ball 10, with which it engages.

The ring 3 is of such thickness, radially as to extend from the inner spherical surface of the casing 2 to the outer spherical surface of the ball 10, and of a thickness along the outer surface to extend from the edge of the cone 4 to the surface of the rotor, at the point where they are nearest together. This point is at the top of Fig. 1 and upon the center line of Fig. 2. At this point the ring completely closes the space between the cone and the rotor and defines the fixed position of an end of the steam chambers.

The opposed surfaces of ring 3 and cone 4 of the fixed bearing member are conical and so constituted as to act as rotative surfaces, although the actual bearing between the two may be in the form of balls, as B, which roll in channels 31 and 40, situated respectively in the ring 3 and the conical surface of the fixed bearing member 4. By the use of ball bearings, the friction between these members may be much reduced.

Each ring 3 and the cylinder or rotor 1 are connected across the steam chamber G, by a partition or piston plate 5, which plate is shown separately in Figs. 8, 9 and 10. This partition or piston plate is secured to one of these members, herein shown as the ring 3, by a pivot joint which will permit a slight oscillating pivotal action, and is mounted in the other so as to permit a reciprocating sliding action in the direction of the plane of the shaft. To this end the ring 3 is provided with a radially disposed conical socket 32 and the piston plate 5 with a corresponding conical pivot head 50, (see Figs. 8, 9 and 10,) fitting therein. The socket 32 along one side connects with the face 30, by a slot of such width that the body of the plate 5 may oscillate slightly therein.

The central rotor body 1 has a slot 13 therein, extending radially and of a size and shape to snugly receive the piston plate 5 and permit its reciprocating therein. In Fig. 1 the section is taken so as to pass through the slots in which the piston plates 5 lie, one of these plates being in its innermost position in its slot and the other in its outermost position in its slot. The balls 10 are also each provided with a slot alining with the slot in the cylinder or rotor 1, and with the pivot socket in the ring 3, and the plate extends inwardly to occupy this slot and thereby prevent leakage of steam at this point. The rotative casing 2 also has a slot 20 alining with the slot 13 in the cylinder 1 and the socket 32 in the ring, and receives the outer edge of the plate 5, thereby effectively preventing steam leakage along the outer periphery of the steam chamber G. The relative size of the piston plate and the steam chamber may be seen at the right half of Fig. 1, in which the plate is shown in its entire extent and the steam chamber is shown in its maximum dimensions by dotted lines lying within the edges of the piston plate. These plates are alike at both ends of the engine. The piston or partition plate 5 serves as a lock to join the rotor cylinder 1, the casing 2 and the ring 3 so as to insure their common rotation. The opposite extreme positions of these piston plates both shown in Fig. 1, respectively in opposite ends of the engine. As the rotation of the parts carries the piston plates away from the point of contact of the ring and rotor, being the position shown at the left end of Fig. 1, and upon the center line of Fig. 2, the steam chamber G is divided thereby into two parts, one of which is being supplied with the propulsive steam under pressure, while from the other, the steam which has served its purpose in turning the engine, is being discharged through a port in the casing 2. The proportion of the entire revolution during which the steam is admitted to the steam chamber, is determined, by the angular extent of the admission ports. As herein shown, steam is admitted during substantially half the revolution and expanded during the remainder of the revolution. By reducing the angular extent of the ports, the period of admission is reduced and the period of expansion is increased.

The means provided for the admission of steam to and its discharge from the steam chamber are as follows: The cylindrical stem or shank 41, which is a part of the fixed bearing member 4, is provided with two annular passages 42 and 43, one within the other, terminating in ports 44 and 45, which open at the concave inner end of the cone, which end surface is in rotative contact with the outer surface of the ball 10 of the rotor 1. Steam is admitted to the steam space only while these ports are in communication with ports provided in the face of the ball 10, and if these ports are short, the period of admission will evidently be short. With ports in the fixed bearing member 4 and ball 10 each of 90° extent, admission will last for 180°, with ports extending through 60°, the period of admission will be for 120°. At the outer end of the cylindrical portion or shank 41 of the fixed bearing member, these passages 42 and 43 connect with ports 46 and 47 formed in the stationary casing 6. In this casing 6 is formed, at each end, a valve chamber 60, within which is placed a hollow plug valve 7, see Figs. 1 and 5, said valve being open at one end, through which opening it receives the steam from the pipe P, and discharges it through a port 70 extending lengthwise of the valves. This valve may be turned so as to register its port with either of the ports 46 or 47, thereby distributing steam through either of the ports 44 or 45, to the surface of the ball 10 of the rotor. This valve is in no sense a cut-off or exhaust valve, but merely a reversing valve. This engine has no separate and distinct cut-off valve.

In the outer surface of the ball 10 are formed two ports 101 and 102, see Figs. 1 and 3, respectively upon opposite sides of the piston plate 5, and so placed as to register, respectively, with the ports 44 and 45, in the concave inner end of the fixed bearing member 4. The port 102 is nearer to the shaft than the port 101 and passes beneath the surface of the said ball 10, (see Figs. 3 and 20) reappearing as a port 100, located at opposite side of the piston or partition plate 5, from the port 101. One of these sets of ports, 44 and 101, or 45, 100 and 102, is in operation to admit steam when the engine is rotating in one direction, and the other set is operating to admit steam when the engine is turning in the opposite direction.

The discharge or exhaust ports and their controlling valves 9, are placed in the periphery of the rotative casing 2, one on each side of the piston plate 5. These ports open from the steam chamber into the chamber between the rotative casing 2 and the stationary outer casing 6, and are controlled by plain slide valves, which, in the form of engine shown in Figs. 1, 2, and 20, are merely flat plates, having holes or ports 99 adapted to register with either of the exhaust ports in the casing, and blank spaces adapted to cover these ports; so that as the valves are moved in a direction parallel with the engine's shaft, the port on one side of the piston plate 5 will be open and the port on the other side closed, the operation of the ports reversing when the engine is reversed.

The exhaust valves 9 are secured to curved bars 90 which extend outside of and over the rotative casing 2 from end to end. At each end they have secured thereto a ring, 91 (see Figs. 1, 2 and 20,) which is provided with a groove adapted to receive a non-rotative ring, 92, which latter ring has connected therewith, at opposite sides, two rods 93, said rods extending through the stationary casing 6, and are there connected with the bifurcated lever 8, this arrangement being preferably duplicated at the other end of the engine.

The valve 7 has secured thereto, outside its casing, a disk 72, (see Figs. 1, 4, 5 and 19), which disk carries a crank pin 73 by which the valve may be turned. The bifurcated lever 8 is pivoted upon the fixed casing 6 at a point 80, (see Figs. 1 and 4). One arm of this lever is provided with a slot 82 which is placed over the pin 73. If the lever 8 be thrown in a direction parallel to the shaft, it will carry with it the pin 73 and thus turn disk 72 and shift the position of the valve 7 connected therewith so as to shift the valve port 70 to one or the other of the ports 46 or 47. In this manner the lever 8 is so connected as to control both the steam admission valves 7 and the discharge or exhaust valves 9 to harmoniously set them for both the forward and reverse motions of the engine, causing the valves to act in unison, and this while the engine is running.

In Figs. 14 to 19 I have shown the above engine modified as necessary to make of it a compound engine. In these figures the diameter of the rotating parts and the size of the steam chamber at the low pressure end is larger than at the high pressure end.

The operating of the engine and the construction of its parts are essentially as in the previously described simple or non-compound engine, except as will hereinafter be particularly pointed out.

The construction of the ball-bearings between the fixed bearing member 4 and the rotative ring 3, is somewhat different from the construction used in the type previously described. As shown in Figs. 14 and 16ª, the ball race-ways, F, F, are made of a separate piece from the ring and fixed bearing member, being steel rings 30ª, which are inserted in channels cut into the bodies of the fixed bearing member, 4 and the ring 3; this construction is applicable to any type of this engine.

Within the body of the fixed bearing member 4 is a somewhat different construction of the ports, which is also applicable to any type of this engine. The ports 44 and 45 open at the conical surface of the fixed bearing member, instead of in the concave end surface, and against the adjacent conical surface of the rotative ring 3. The angular extent of these ports will determine the portion of the revolution during which the steam is to be admitted.

In Figs. 16 and 17 I have shown opposite face views of the rotative annulus or ring 3 used on the low pressure side, and in Fig. 18 a face view of the fixed bearing member for the same side. In the low-pressure side I have arranged for admission of steam throughout practically the entire revolution; therefore the ports in the faces of the fixed bearing member 4 and of its corresponding conical socket in the ring 3, each extend throughout approximately one-half the circumference of these conical surfaces. In this form of construction the steam is discharged through the ring 3, escaping through ports 33, 33ª, which open in that face of the ring which is opposed to or faces toward the face 12 of the rotor 1, and are located close to and at each side of the socket 32, which receives the head 50 of the partition or piston plates 5.

The valves shown in Figs. 14 and 19 which control the admission of steam to the ports of the fixed bearing member 4, and by which the engine is reversed, are different from those of the type previously described, and also differ in the high and low pressure ends. The valve 7ª for the high pressure end is the same in principle and also in construction, as the valve 7 previously described, except as it is modified by the necessity or desirability of providing means whereby high pressure steam may be admitted directly to the low-pressure cylinder. To provide for this, an extra port 74 is made in the valve 7, and the port 70 is made of excess width, so that it will communicate with the ports leading to the member 4 while permitting the opening and closing of the passover ports 75 or 76 by a further turning of the valve.

In the valve casing is formed a steam channel 77, which connects with the valve chamber by two ports 75 and 76, one of these ports being in use as a passover port when operating the engine in one direction of rotation, and the other port when the motion is reversed. In the position of the parts as shown in Fig. 14, steam is being passed through the ports 70, 46 and 44, but through neither of the pass-over ports 75 or 76. This is the condition when not using the pass-over; that is, when the engine is being operated compound. The port 70 is sufficiently wide so that, when the valve is shifted so as to bring port 74 in registry with port 75, the discharge through the port 70 will continue into port 46. Similarly the port 70 may be made to register with the port 45 both when the port 74 is and is not in registry with the port 76.

The chamber E, between the rotative casing 2 and the non-rotative casing 6, is normally used as an intermediate steam chamber between the high and low pressure steam chambers or cylinders G. The discharge from the high pressure end of the engine into the intermediate chamber E, is controlled by a valve 9', which is functionally like the valve 9 described. This valve (see Figs. 21 and 22) is however made as a ring extending around the casing and having an inner tapering surface seating upon a tapering surface formed upon the outside of the rotative casing 2. Its port 97 is adapted to register with either of the ports 98 extending through the rotative casing 2, by a rotative movement of the valve upon its seat. As shown in Fig. 21 it is in register with one of these ports 98 and the position of the other port 98 is shown in dotted lines.

The valve is held in its position lengthwise the shaft by bolts 105 which pass through slots 104 in a flange 103 located upon the inner edge of the ring 9', and screwing into a flange 105 upon the casing 2. The bolts do not clamp the valve to hold it fixedly, but simply serve as guides to hold it in place, free to turn upon its seat.

The ring valve 9' is provided with two arms 94, which extend inwardly or toward the shaft and with their inner ends entering grooves 96 formed in a sleeve or arm 91$^a$, which is part of or secured to the ring 91, which is controlled by the ring 92, links 93 and hand lever 8, after the manner before described. The groove 96 extends at an angle with the direction of the shaft, so that movement of the sleeve 91$^a$ lengthwise the shaft will produce a rotative movement of the valve ring about the shaft. To increase the amount of this movement I provide a corresponding groove 96$^a$ upon the inner surface of the ring 91$^a$, within which is a projection or pin carried by the sleeve 25, upon which this ring turns, which sleeve is a part of the casing 2. In this way the rotative movement caused by the reciprocation of the ring 91, 91$^a$ is doubled in amount over what it would be if a single groove 96 were used.

The valve 7$^b$ controlling the low-pressure steam, in principle resembles the other valve 7$^a$, but differs in construction to enable it to properly dispose of the steam when both ends of the engine are operated upon live steam, in starting, or to gain an increase in power. A longitudinal section of this valve is given in Fig. 19, and the cross section in the center of its length is given in Fig. 14. This valve is hollow and has transverse partitions 7$^g$ and 7$^h$, and a longitudinal U-shaped partition 7$^d$ which divides its interior into three parts or chambers, the chamber 7$^c$ at one end, centrally placed radial passage 7$^f$, and the passage 7$^c$ which partially encircles the chamber 7$^f$. The chamber 7$^c$ and 7$^f$ communicate with each other, and the chamber 7$^f$ also with the chamber 61 of the valve casing, which is the supply chamber, which supply chamber communicates at 64 with a pass-over pipe 79, leading from the chamber 77 at the other end of the engine.

The central chamber 7$^f$ may, by rocking the valve, be made to communicate with either of ports 62 and 63 in the valve casing, which ports communicate, respectively, with the steam passages 44 and 45 in the shank of the fixed bearing member 4. Also the exhaust chamber 7$^e$ is at the same time in communication with that one of the ports 62 and 63 which is not in communication with the chamber 7$^f$.

The ports 62 and 63 are used oppositely, one to supply the working steam to the steam chamber and the other to exhaust the steam therefrom, and this function is reversed by rocking the valve 7$^b$ so as to reverse the connection of the chambers 7$^e$ and 7$^f$ with said ports 62 and 63. The exhaust chamber 7$^e$ is in constant communication with the exhaust pipe P' and may be placed in communication with the intermediate chamber E through the port 65 by shifting the valve to the limit of its throw in either direction.

The position of the valves 7$^a$ and 7$^b$ as shown in Fig. 14, is that occupied when the engine is operated compound, the valves both occupying positions a little short of their extreme positions. The valve 7$^b$ may be turned left-handedly a sufficient distance to uncover port 65, thereby placing the exhaust chamber 7$^e$ in communication with the intermediate chamber E which lies between the outer stationary case 6 and the inner rotative casing 2, which chamber receives the discharge from the opposite end of the engine. The two valves 7$^a$ and 7$^b$ being connected by the bar 78 (Fig. 15) to turn oppositely, both will be in position to open the pass-over ports 65 for the valve 7$^b$, and 75 or 76 for the valve 7$^a$. The passage 7$^f$ has an excess width similar to that before explained for the port 70 of valve 7$^a$ whereby it may be moved so as to cover or uncover port 65 without disturbing its connection with ports 62 or 63, as the case may be.

The exhaust from the high pressure end of the engine is through port 97 of valve 9' into the intermediate chamber between the rotative casing 2 and the stationary casing 6.

The valve-controlling lever 8 is connected with the rods 93 through which the valve 9' is operated, and also with the crank pin 73 through which the valves 7$^a$ and 7$^b$ are controlled. It will be seen by reference to Fig. 15 that this lever has no pivotal connection except with the rods 93 and with the crank pin 73. The resistance offered by the turning of the valves 7$^a$ and 7$^b$ is much less than that required to turn the ring valve 9'. As a consequence, when the lever is moved, the first result is the moving of the valves 7$^a$ and 7$^b$ without moving the ring valve 9', until after the valves 7ª and 7ᵇ have been moved to their limit.

The throwing of the valves 7ª and 7ᵇ to their limit means the throwing into use of the passover ports 75 or 76 and the opening of the port 65. To throw these out of use it is necessary to throw the valves 7ª and 7ᵇ back a slight distance. This may easily be done by moving the lever 8 backward without disturbing the valve 9', as the movement of the valves 7ª and 7ᵇ precedes the movement of the valve 9'. The valves may, in this way, be placed in a central position in which all steam flow through the passover pipe 79 is cut off, in which the engine is operated compound or in extreme positions, in which both are operated on straight steam, or as simple engines, the whole being controlled by the manipulation of the lever.

When the engine is to be operated only as a simple engine, that is, without compounding, and to turn in one direction only, then the valves 7, 7ª, 7ᵇ, 9 and 9' may be dispensed with and an ordinary hand controlled valve on the steam supply substituted. The exhaust ports controlled by the valves 9 and 9' would remain open at all times. The admission of steam would be controlled in duration by the angular extent of the ports in the fixed bearing members 4 and the ports in the ball 10. The edge of the ring 3 would act to cut-off the steam to a certain extent.

When the engine is to be operated in one direction only, or as an air compressor, or as a pump, the valves 7 and 9 with their connections, are superfluous, and the engine or compressor will operate through the use of plain ports which are in the same relative position as in the reversible type, but of one-half the number.

It will be noted that, with the type of steam admission shown in Figs. 14, 16 and 17, the steam is transferred across the opposed conical faces of the fixed bearing member 4 and the ring 3. That is the steam in passing from the port 44 or 45, as the case may be, to the corresponding port 34 or 34ª of the rotating ring 3, passes across the complemental and opposed surfaces of the member 4 and ring 3, and if the pressure of this steam becomes diffused between these surfaces, as it will unless these surfaces are fitted extremely closely, and possibly even then, there will be a thin film of steam, or possibly water produced by the condensation of steam, lying between these surfaces. The film of steam or water will be under the same pressure as the supply steam and will therefore more or less counterbalance the pressure of steam against the opposite face of the ring 3, thereby relieving the balls B of this pressure and causing the ring to be supported and turned upon a film or fluid, which will reduce materially the friction and wear. The same effect will be further insured by an amount equal to the pressure of the steam upon an area corresponding to that of the ports connecting the ring and cone. The same effect may easily be secured in the construction shown in Figs. 1 and 2.

The outer stationary casing 6 is preferably provided with an opening in its upper side, closed by a removable plate 68.

What I claim as my invention is:

1. In a rotary engine, in combination, two members rotative about diverging axes and having rolling contact along a radial line, a casing surrounding both said members and rotative with one of them, a piston or partition plate having controlling connection with one of said rotative members, the other rotative member and the casing having slots for receiving said plate.

2. In a rotary engine, in combination, two members rotative upon diverging axes and having rolling contact along a radial line, a casing surrounding both said members and secured to rotate with one of them, said casing and its attached member having radially extending slots adapted to receive a piston or partition plate, and a piston or partition plate having a controlling connection with the other of said rotative members and slidable in said slots in the casing and its attached rotative member.

3. In a rotary engine, in combination, two members rotative upon diverging axes and having rolling contact along a radial line, a casing surrounding both said members and secured to rotate with one of them, said casing and its attached rotative member having slots lying in an axial plane and opening to the steam chamber between said rotative members, the other rotative member having a radially extending pivotal connection lying in the same plane, a piston or partition plate pivoted by said pivotal connection with one of said rotative members and slidable in the said slots in the others, said piston or partition plate forming a division extending continuously across the space between said rotative members, and means for controlling the admission and discharge of steam from the space between said rotative members.

4. In a rotary engine, in combination, two members rotative upon diverging axes having a common point of intersection, said members having continuous rolling contact along a radial line, said rotative members having complementary ball-and-socket surfaces concentric with said common point, a casing surrounding both said members and rotative with one of them, a piston or partition plate connecting both said rotative members and closing the space between said members at all times, said ball and the casing having slots receiving the edges of the piston or partition plate, and means for controlling the admission and discharge of steam to the space between said rotative members.

5. In a rotary engine, in combination, two members rotative upon diverging axes and having rolling contact along a radial line between radial surfaces, said members having complementary spheroidal surfaces forming a ball-and-socket joint, that member having the outer-most surface of said joint having an outer concentric, spheroidal surface, a casing surrounding both said rotative members and having an inner spheroidal surface fitting the corresponding surface of one of said rotative members and rotative with the other of said members, a piston or partition plate having a radial pivotal connection with that one of said rotative members having the concentric spheroidal surfaces, the other rotative member and the casing having slots receiving the said plate and permitting sliding therein.

6. In a rotary engine, in combination, a shaft, fixed bearings for the shaft, a disk carried by and rotative with the shaft between said bearings, a ring in the form of a spherical annulus surrounding said shaft between the disk and a bearing, a rotative bearing for said ring carried by the bearing for the shaft and holding said ring with its polar axis intersecting the axis of the shaft, said ring having a radial surface in constant rolling contact with the end surfaces of the disk along a radial line, a radial piston or partition plate extending across the space between said disk and ring in all positions thereof, a casing surrounding said ring and disk, and means for admitting and discharging steam from the space between ring and disk.

7. In a rotary engine, in combination, a shaft, fixed, bearings therefor, a disk carried by and rotative with said shaft between said bearings, a ring in the form of a spherical annulus surrounding said shaft between the disk and a bearing, a rotative bearing for said ring carried by the bearing for the shaft and holding the ring with its axis of rotation intersecting the axis of the shaft, and also with a radial surface in continuous rolling contact with an end surface of the disk along a radial line, a radially extending piston or partition plate of a size to extend across the space between ring and disk at all times, the disk having a radial slot receiving the said plate, the ring having a radial socket and the plate a socket head entering said socket, and means for admitting and discharging steam from the space between ring and disk.

8. In a rotary engine, in combination, a shaft, fixed bearing members therefor, a disk carried by and rotative with said shaft between bearings, a ring in the form of a spherical annulus surrounding the shaft between the disk and a bearing, a fixed bearing for said ring holding it with its axis of rotation intersecting the axis of the shaft and with a radial surface in continuous rolling contact with an end of the disk, a casing surrounding the disk and ring and rotative with the disk, said casing and disk having a radially disposed socket communicating with its rolling surface and alined with the slots in the casing and disk, and a piston or partition plate having a socket head adapted to fit the socket in the ring and its edges to enter the slots in the casing and disk.

9. In a rotary engine, in combination, a disk rotative upon its axis, a spherical annular ring at each side of said disk and rotative upon axes which are divergent from each other and from the axis of the disk, said rings each having a radial surface of revolution having constant rolling contact with the adjacent side surface of the disk, a casing surrounding said rings and disk and having spherical surfaces matching those upon the rings, piston or partition plates extending across the spaces between rings and disk at all positions thereof, and means for admitting and discharging steam from said spaces.

10. In a rotary engine, in combination, a rotor disk rotative about its axis, a spherical annular ring at each side of said disk and rotative upon axes which are divergent from each other and from the axis of the disk, said rings each having radial surface of revolution having constant rolling contact with the adjacent radial surface of the disk, a casing surrounding rings and disk and rotative with them, piston plates extending across the space between rings and disk in all positions thereof, the casing, disk and rings having alining slots receiving the edges of said piston plates, and means for admitting and discharging steam from the spaces between the rings and disk.

11. In a rotary engine, in combination, a shaft having a disk secured thereto, a ring surrounding said shaft adjacent to the disk and secured to turn upon an axis intersecting that of the shaft, a casing inclosing disk and ring, a piston plate crossing the space between ring and disk, and means for admitting steam to the space between ring and disk through said ring.

12. In a rotary engine, in combination, a shaft mounted to rotate, a disk extending transversely of and fixed to rotate with said shaft and having radial surface of rotation at one side, a rotative ring-like member surrounding the shaft with its axis of rotation diverging from that of the disk, and having a radial surface in continuous rolling contact with the radial surface of the disk, a casing surrounding ring and disk, said casing and ring having spherical surfaces in contact and the ring rotating with the disk, a piston or partition plate extending radially of the shaft and of a size to extend across the space between ring and disk at its maximum, said casing and disk having slots receiving the said plate and the ring and plate having interlocking pivotal engagement, and means for admitting steam to the space between ring and disk through the ring.

13. In a rotary engine, in combination, two members rotative upon diverging axes and having rolling contact, a casing surrounding both said members and rotative with one of them, said members having ball-and-socket parts engaging concentric their common center, the ball member of said pivot having ports therein controlled by the rotation of the ring, and a piston plate or partition having a radial pivotal connection with one of said members, the other rotative member having a slot within which said plate reciprocates.

14. In a rotary engine, in combination, two members rotative upon diverging axes with radial surfaces in rolling contact, a casing surrounding both said members and rotative with one of them, one of said members having a slot lying in a radial axial plane, a piston plate lying and reciprocating in said slot and having a radial pivot connection with the other rotative member, and means for admitting and discharging steam from the space between said rotative members and the casing.

15. In a rotary engine, in combination, a disk member having a concentric hemispherical projection at its side, and rotative about its axes, a complemental member rotative about an axis diverging from that of the disk and having concentric spheroidal surfaces, one of which matches and contacts with the hemispherical projection of the disk, and also having a radial conical surface having rolling contact with the side surface of the disk, a casing rotative with the disk member and having a spheroidal surface fitting the outer spheroidal surface of the other rotative member, and a piston or partition plate extending across the space between said rotative members in all positions.

16. In a rotary engine, in combination, a shaft mounted to turn in bearings, a disk-like rotor carried by the shaft, two ring-like members surrounding said shaft, one at each side of said disk, and rotative about axes which diverge from the axis of the shaft in differing directions, said ring-like members having conical faces in rolling contact with the adjacent faces of the disk, a casing surrounding all three of said rotative members, a piston or partition plate extending at all times across the space between said rotative members and the casing, and means for admitting and discharging steam from the space between said rotative members.

17. In a rotary engine, in combination, two power generating members rotative upon diverging axes and having concentric spherical surfaces forming a ball-and-socket joint, a fixed bearing member for that one of said power generating members which has the socket part of said joint and having an end surface forming a part of said socket; said bearing member having ports extending to its socket and the ball member having ports coöperating therewith.

18. In a rotary engine, in combination, two power generating members rotative upon diverging axes and having parts constituting a ball-and-socket joint, a fixed bearing member for that one of said rotative members which constitutes the socket, said bearing member having a surface which constitutes a part of said socket and having ports extending to its socket surface, the ball part of said joint having ports registrable with said ports in the bearing member to control the steam.

19. In a rotary engine, in combination, two members rotative upon diverging axes and provided with spherical surfaces constituting a ball-and-socket bearing, a shaft passing through said ball-and-socket bearing and secured to and forming the axis of that one of said rotative members which carries the ball part of said bearing, a fixed bearing for said shaft carrying also a rotative bearing for the other rotative member and having a spherical surface forming part of the socket of said ball-and-socket bearing, said fixed bearing member having ports extending from its outer end to its said socket surface, the ball member of said bearing member having ports adapted to coöperate with the ports in said fixed bearing member to control the admission of steam.

20. In a rotary engine, in combination, a disk rotative upon an axial shaft, a ring rotative upon an axis diverging from that of the shaft, said disk and ring having respectively engaging ball-and-socket parts forming a bearing pivot concentric to said shaft, a fixed bearing member for said shaft having a rotative and thrust bearing for said ring and also having a concaved inner end forming a part of said socket and ports leading to said socket surface, the ball of said socket bearing having ports adapted to coöperate with the ports in the bearing member to determine the admission of steam.

21. In a rotary engine, in combination, a shaft, a disk secured to said shaft, a fixed bearing member for the shaft, a rotative ring surrounding the shaft, the fixed bearing member having a rotative and thrust bearing supports for said ring and maintaining the ring in rotative position with its polar axis intersecting the axis of the shaft and with a side surface in constant rolling contact with a side surface of the disk, a casing inclosing ring and disk, said disk having a central spheroidal projection and the fixed bearing having a complemental recess in its end, said fixed bearing having ports extending from its outer end to the said recess in its inner end, and the spheroidal projection upon the disk having ports in its face adapted to engage with ports in the fixed bearing.

22. In a rotary engine, in combination, a shaft, fixed bearings therefor, a disk secured to said shaft between bearings, a ring surrounding said shaft at each side of the disk and inside the bearings, said rings and fixed bearings having rotative and thrust bearings holding said rings to rotate with their axes of rotation at an angle with the shaft and with a face in rolling contact with the face of the disk, said rings having an inner and an outer spheroidal surface and the disk having central spheroidal projections fitting in the inner spheroidal surfaces of the rings, piston or partition plates occupying planes radial to the shaft, the disk and its central spheroidal projections and the casing, having slots receiving the said piston or partition plates, and the rings having alined radial and conical sockets opening to their edges, the partition plates having conical heads adapted to fit said sockets in the rings and its body fitting and sliding in the slots in the other members, the spheroidal disk projections having ports in their surfaces adjacent the piston slots, the fixed bearings having spheroidal surfaces fitting the like surfaces upon said disk projections and having ports extending to said spheroidal surfaces.

23. In a rotary engine, in combination, a plurality of rotative members turning upon diverging axes and with surfaces in continuous rolling contact, a casing surrounding and turning with said rotative members, means for admitting and discharging steam from the spaces between said rotative members and the casing, fixed bearing members at each end of the casing furnishing support for both sets of rotative members, a valve controlling the steam admission and located at the outer end of said fixed bearing member, a valve controlling the exhaust and mounted upon the revolving casing, a lever for shifting said admission valve, a bar connected with the exhaust valve to control it, a ring connected with said shifting lever and having a rotative connection with the bar controlling the exhaust valve, whereby both valves are under a common control.

24. In a rotary engine, in combination, a shaft, a rotor thereon having radial surfaces of revolution, rings at each side of the rotor and surrounding the shaft, bearing members for the shaft having also bearings for said rings adapting them to turn upon axes diverging from that of the shaft and with surfaces contacting with said radial surfaces of the rotor, a casing surrounding rotor and rings, partition plates extending radially across the spaces between rotor and rings, said fixed bearing members having each two ports for the supply of steam to the spaces between rotor and rings, said ports opening upon respective sides of the piston or partition plates, the casing having discharge ports at each side of the said plates, valves controlling said casing ports to permit either one to be opened, a valve controlling the ports of the fixed bearing members, a lever connected with said last mentioned valve to shift it, and a bar connected with the valve controlling the casing ports and also connected with the lever by which the other valves are shifted.

In testimony whereof I affix my signature in presence of two witnesses.

JACOB B. GROH.

Witnesses:
H. L. REYNOLDS,
A. S. WYSONG.

---

Copies of this patent may be obtained for five cents each, by addressing the "Commissioner of Patents, Washington, D. C."